3,508,785
VEHICLE ROLL-OVER PROTECTION DEVICE
Fu-Shueng Chang, Melvindale, Mich., assignor to Ford Motor Company, Dearborn, Mich., a corporation of Delaware
Filed Oct. 14, 1968, Ser. No. 767,292
Int. Cl. B62d 25/10
U.S. Cl. 296—76          5 Claims

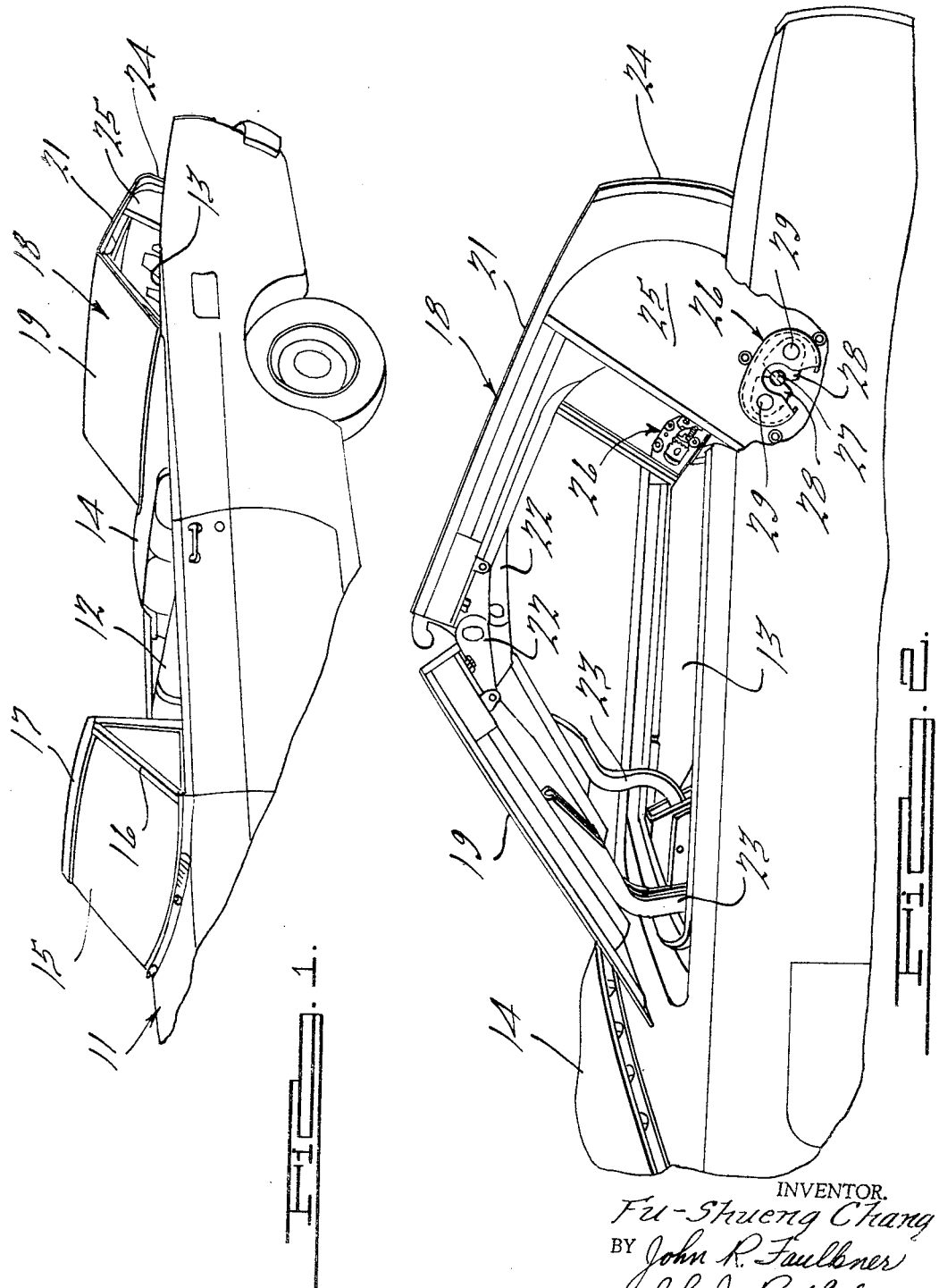

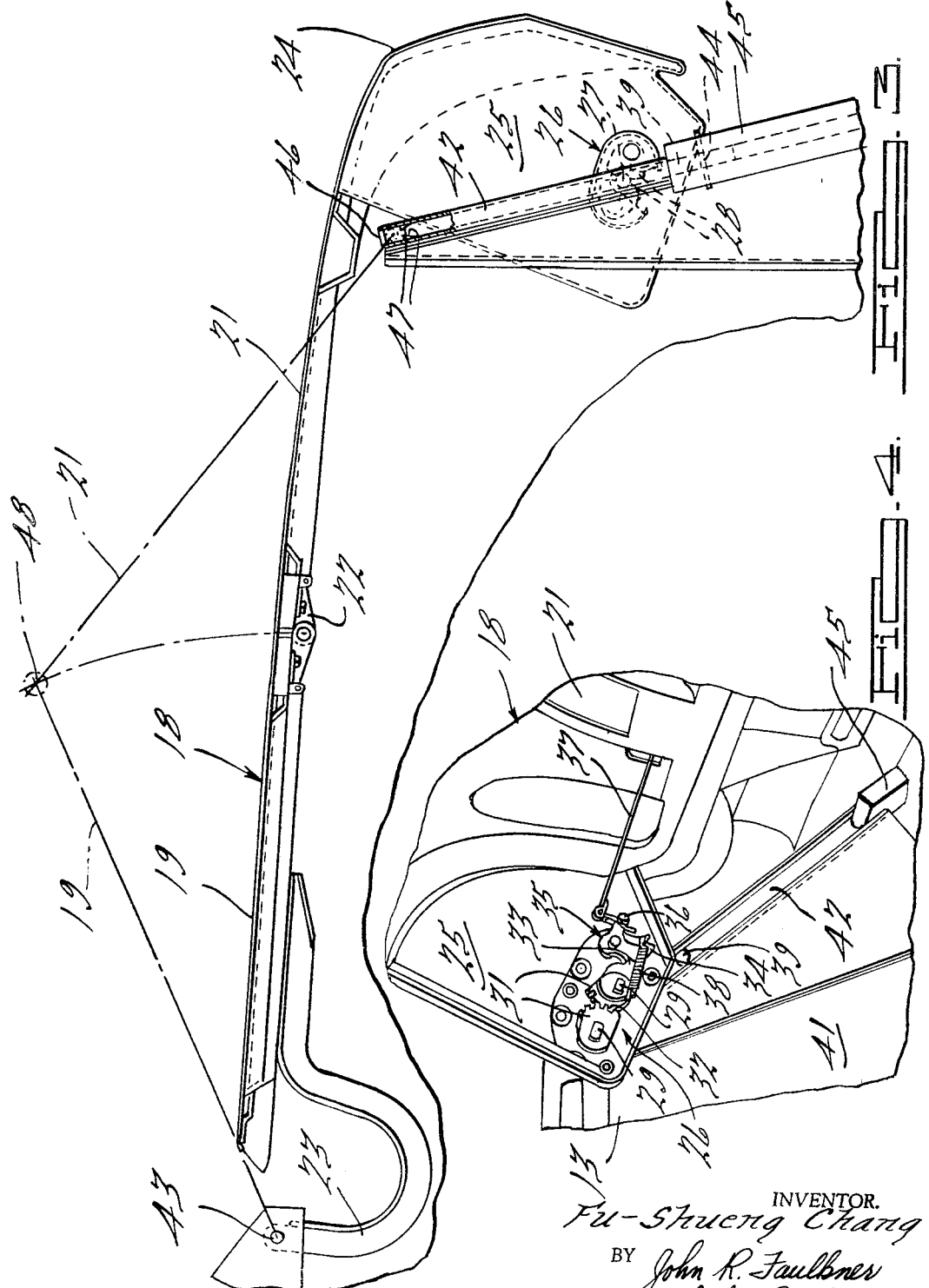

ABSTRACT OF THE DISCLOSURE

A roll-over protection device for a vehicle body having a passenger compartment and a luggage compartment. The luggage compartment deck lid is articulated. Upon the vehicle inadvertently being inverted relative to a road surface as the result of a collision or other mishap, the deck lid is articulated into a triangular structure. The apex of this structure projects above the normal closed position plane of the deck lid. The function of the deck lid in triangulated condition is to protect the vehicle occupants against being crushed beneath the vehicle.

BACKGROUND OF THE INVENTION

Although the modern passenger vehicle has a relatively low center of gravity and is not prone to being upset so as to come to rest in a wheels up posture, some vehicle design authorities are of the opinion that roll-over protective devices or roll bars should be incorporated in the body structure. Convertibles, vehicles having a collapsible soft top, are not readily adaptable to the addition of a roll bar integrated with the top supporting framework. In a convertible the roll bar has to be a non-integrated structural member with respect to the vehicle top that will remain or be capable of becoming functional even if the top is collapsed or folded for storage.

A fixed roll bar, one that remains in position if the foldable top is in an up or down position, does not have aesthetic appeal. It has been proposed in the prior art to conceal the roll-over protective devices in the vehicle boy side panels (see U.S. Patent 1,291,496) or rearwardly of the front passenger seat (see U.S. Patent 3,292,-726). In the event of an accident, the protective devices are triggered into movement into operative position in which they extend above the passenger compartment area.

The curved side panels of modern vehicle bodies and the packaging of the latch mechanism, window regulator and other accessories make the side panel approach for storing the protective devices rather difficult to handle from an engineering design standpoint. The behind the seat approach encroaches on the already limited space availability between the front and rear seats within the passenger compartment.

It is therefor an object of the present invention to integrate the roll-over protective device in the vehicle luggage compartment deck lid without interferring with the use of the deck lid as a normal means of access to the luggage compartment of the vehicle body.

SUMMARY OF THE INVENTION

The roll-over protective device embodying the present invention is particularly adapted for use with a vehicle body having a passenger compartment and a luggage compartment. It comprises an articulated deck lid forming a closure for the luggage compartment. Conventional hinge means supports the deck lid at one end on the vehicle body for normal swinging movement between closed and opened positions. At its end opposite the hinged end the deck lid is coupled to an articulating means operative to raise the free end of the deck lid out of closed position to cause the latter to articulate into a triangulated structure. The apex of the triangulated structure projects above the normal closed surface of the deck lid. The function of the deck lid in triangulated condition is to maintain the passenger compartment in spaced relationship to the roadway in the event the vehicle is upset into an inverted condition.

DESCRIPTION OF THE DRAWINGS

Other objects, advantages and features of the present invention can be made more apparent as this description proceeds, reference being had to the accompanying drawings, wherein:

FIG. 1 is a fragmentary perspective view of a vehicle body of the convertible type with the roof structure collapsed or folded into a stored position and the rear deck lid in a triangulated condition to act as a roll-over protective device;

FIG. 2 is an enlarged side elevation of the deck lid structure in the position shown in FIG. 1;

FIG. 3 is a side elevation with parts of the vehicle body broken away showing the deck lid structure in normal luggage compartment closure position; and FIG. 4 is an enlarged fragmentary view of the mechanism as it appears from the inside of the luggage compartment looking toward one corner.

DETAILED DESCRIPTION OF THE INVENTION

Referring now to the drawings, there is illustrated in FIG. 1 a portion of a vehicle body, generally designated 11, of the convertible type. The vehicle body 11 has a passenger compartment 12, a luggage compartment 13 and a collapsible or foldable soft top (not visible) which is adapted to be stored in a storage compartment 14 between the passenger and luggage compartments 12 and 13, respectively.

The forward portion of the passanger compartment is protected by a windshield 15 surrounded by a frame comprising a front pillar 16 at each side and a header rail 17 across the top.

The luggage compartment 13 is provided with an articulated closure or deck lid 18. The deck lid 18 is articulated in the sense that it comprises two sections, a forward section 19 and a rear section 21 connected by hinge devices 22 located at each side.

The deck lid 18 is hinged to swing as a unit from luggage compartment closed to luggage compartment opened position on conventional goose neck hinge members 23 extending between a body structural member 24 and the deck lid forward section 19.

The deck lid rear section 21 has at its rear end 24 depending side panels 25. Mounted on each side panel 25 is a latch mechanism, generally designated 26, adapted to have latching engagement with a striker pin 27. Each striker pin 27 is supported on a side wall of the luggage compartment 13 in a manner to be described.

As best seen in FIG. 2, each striker pin 27 is circular in cross section and is adapted to be gripped between a pair of latch device jaws 28. Each jaw 28 is carried on a pivot shaft 29 coupled to a latch plate 31. The latch plates 31 have intermeshed gear teeth 32. One of the latch plates 31 has an abutment 33 engageable by a detent portion 34 of a detent lever 35 (see FIG. 4). An arm 36 of the detent lever 34 is coupled to a cable 37 which extends to a conventional key operated lock device (not shown) in the center of the rear panel 24 of the deck lid. The control plates 31 and the detent lever 35 are spring loaded by a tension spring 38 which tends to rotate the control plate and thereby the latch jaws 28 toward unlatched position while at the same time maintaining the detent lever 35 in condition to engage the control plate abutment 33 when the latching jaws are rotated toward latched position upon engagement with the striker pin 27.

The latch mechanisms 26 are modifications of the vehicle side door latch mechanisms disclosed in U.S. Patent 2,987,336. The foregoing brief description should be adequate for an understanding of the part the latch mechanisms play in the present invention, particularly when the operation of the entire system is described.

Each striker pin 27 is mounted on a carrier 39 slidable in a guide means mounted on the inner side panels 41 of the luggage compartment. The guide means comprises a pair of track members 42 each of which is upwardly and forwardly inclined from the bottom of the vehicle body. The term "forwardly inclined" is with reference to the hinge axis 43 of the goose neck hinge arms 33 since this is a fixed hinge axis. In a vehicle with the luggage compartment to the rear of the passenger compartment, the hinge axis 43 would be forward of the other deck lid components.

As best seen in FIG. 3, each carrier 39 is held against movement by a shear pin 44. Each carrier 39 is adapted to be forcibly driven along its respective track by an energy source. This energy source may be a shotgun shell housed in a chamber 45 and adapted to be triggered electrically by an inertia device actuatable electric circuit such as is disclosed in U.S. Patent 3,292,726.

The upper end of each track 42 is fitted with a stop 46 and striker pin 27 retention lugs 47 spaced a short distance below the stop 46.

OPERATION

The normal closed and latched position of the deck lid 18 relative to the luggage compartment 13 is as shown in FIG. 3. When in this position the two deck lid sections 19 and 21 lie in a substantially common plane or a plane which approximates the normal contour of the upper surface of the deck lid. The latch mechanisms 26 are in gripping engagement with the respective striker pins 27. The striker pins 27 are at their lowermost position on the respective guide tracks 42 and they are held there by the relationship of the shear pin 44 which projects through the pin carriers 39 and the energy source housing 45. When it is desired to load or unload the luggage compartment in a normal fashion, the key operated mechanism or operating handle mounted in the center of the rear panel 24 of the deck lid is actuated to place the release cables 37 under tension. This results in the detent levers 35 being disengaged from the control plates 31 of the respective latch mechanisms 26 causing the springs 38 to move the control plates and the latch jaws 28 out of latching engagement relative to the striker pins 27. The deck lid may then be swung upwardly as a unit about the hinge axis 43.

When it is desired to close the deck lid 18, it is swung about the hinge axis 43 in a normal manner so as to force the rear end 24 downwardly and the latch mechanisms 26 into engagement with the respective striker pins 27. The deck lid then will be held in closed latched condition.

In the event that the vehicle is being driven along a highway or roadway and is suddenly subjected to violent forces such as would be caused by a collision with another vehicle or a stationary object, the resultant sudden change of vehicle motion or direction would be sensed by a suitable inertia switch or similar mechanism (see U.S. Patent 3,292,726) and an energy source contained within the energy source housing 45 would be triggered. Each of the striker pin carriers 39 located on the opposite side walls of the luggage compartment would be driven forcibly up the track members 42. This would result in the deck lid 18 becoming a triangulated structure with the deck lid section 19 swinging about the fixed hinge axis 43 and the deck lid section 21 swinging about the hinged axis formed by the latch jaws 28 encompassing the circular striker pins 27. The center pivot or hinge axis of the hinge devices 22 connecting the two deck lid sections 19 and 21 to each other would move upwardly to the position indicated at 48 in FIG. 3.

The striker pins 27 are forcibly moved upward until they abut the stops 46 at the top of each track member 42. There is no impairment of the latching function of the latch mechanisms 26 during such movement or in the final stop abutting position. When the striker pins 27 abut the stops 46 at the top of each track member, they are restrained against downward movement by the lugs 47. It will be understood the lugs 47 are mounted to yield as the striker pins 27 pass between them but are effective to restrain reverse direction of movement of the striker pins. The deck lid sections 19 and 21 therefor form a triangulated structure which as seen in FIGS. 1 and 2 project a substantial distance above the upper surface or the belt line of the vehicle body.

If it should happen that the violence of the collision or other mishap involving the vehicle, such as running off the road into a ditch, is such that the vehicle is flipped over and inverted so that its wheels are up in the air, the passenger compartment area will be supported in spaced relation to the ground or roadway. It has been found that the windshield supporting structure seldom collapses completely. With a triangulated deck lid structure projecting upward to the extent that it is capable, the vehicle occupants would have a reasonable degree of freedom of movement beneath the overturned vehicle and perhaps sufficient room to crawl out from under the vehicle.

In the event that the deck lid is triggered into a triangular condition without the vehicle actually becoming inverted, no damage will be done to the system other than to require replacement of the energy sources, such as the shotgun shells, which have been expended. A tool can be inserted between the retaining lugs 47 to cause the latter to be spread apart to permit the striker pins 27 and their respective carriers 39 to be restored to their normal position at the lower end of the track members 42. The striker pins in their restored position again will be engageable by the latch mechanisms carried on the side panels 25 of the deck lid assembly 18 to hold the deck lid in normal latched position.

It is to be understood that this invention is not limited to the exact construction illustrated or described above, but that various changes and modifications may be made without departing from the spirit and scope of the invention as defined by the appended claims.

I claim:

1. A roll-over protection device for a vehicle body having a passenger compartment and a luggage compartment comprising:
   an articulated deck lid forming a closure for said luggage compartment,
   hinge means supporting said deck lid at one end on said body for normal swinging movement between closed and opened positions,
   and articulating means operative to cause said deck lid to articulate from a normal luggage compartment closure structure into a triangulated structure the apex of which projects substantially above the deck lid surface in normal closed position of the latter,
   said articulated structure maintaining the passenger compartment in spaced relationship to a roadway in the event the vehicle is upset into an inverted condition.

2. A roll-over protection device for a vehicle body having a collapsible top over a passenger compartment, comprising:
   a luggage compartment deck lid articulated intermediate its ends,
   hinge ends supporting said articulated deck lid at one of its ends on said vehicle body for swinging movement about a fixed hinge axis,
   combination latch-hinge means releasably latching said articulated deck lid at its other end to said vehicle body,
   release of the latch function of the latch-hinge means enabling said deck lid to be swung upwardly as a unit about said fixed hinge axis to provide access to the luggage compartment area, guide means along which the combination latch-hinge means is shiftable from deck lid closed position without interruption of the latching function to a position displaced upwardly and angularly relative to the bottom of the vehicle body and toward the fixed hinge axis, the shifting of said combination latch-hinge means to said displaced position causing articulation of said deck lid into a substantially triangulated structure effective to support the vehicle body passenger compartment area in spaced relationship to the roadway in the event the vehicle is upset and attains an inverted attitude.

3. A roll-over protection device according to claim 2, in which:

the combination latch-hinge means includes latch device means carried on the deck lid and striker pin means slidably journalled in the guide means, the guide means being mounted on the luggage compartment side walls of the vehicle body, said latch device means when in latching engagement with the striker pin means also being pivotal thereabout to function as a hinge means without interruption of the latching function.

4. A roll-over protection device according to claim 2, in which:

the combination latch-hinge means includes latching devices located on each side of the deck lid remote from the fixed hinge axis coacting with striker pins carried on slide members, the guide means comprises guide channels mounted on each side wall of the vehicle body luggage compartment each having a slide member movable therein, each latch device when in latching engagement with its coacting striker pin also being pivotal thereabout to function as a hinge means without interruption of the latching function during articulation of the deck lid.

5. A roll-over protection device for a vehicle body having a passenger compartment, a luggage compartment and a collapsible top over the passenger compartment, comprising:

a luggage compartment deck lid, a first hinge means separating said deck lid into two sections for articulation about a first hinge axis, a second hinge means supporting said articulated deck lid at one of its ends on said vehicle body for swinging movement as a unit about a fixed hinge axis, a combination latch-hinge means releasably latching said articulated deck lid at its other end to said vehicle body, said combination latch-hinge means including latch devices mounted on each side of the deck lid remote from the fixed hinge axis and coacting with striker pins carried on movable carriers, guide means comprising a track member secured to a wall of the luggage compartment at each side thereof, said track members being upwardly and angularly forwardly inclined relative to the bottom of the vehicle body and slidably journalling said striker pin carriers thereon, said combination latch-hinge means being shiftable along said guide means without interruption of the latching function to a displaced position in which said deck lid sections are swung relative to each other about said first hinge axis to form a triangulated structure the apex of which projects above the normal plane of the deck lid in closed position of the latter.

References Cited
UNITED STATES PATENTS 3,292,726  12/1966  Jetter               180—104
3,434,754   3/1969  Scaglione        296—76

BENJAMIN HERSH, Primary Examiner

R. R. SONG, Assistant Examiner

U.S. Cl. X.R.

280—160